Sept. 30, 1941.  D. S. RENWICK  2,257,534
WINDSHIELD WIPER MOTOR
Filed Aug. 7, 1939
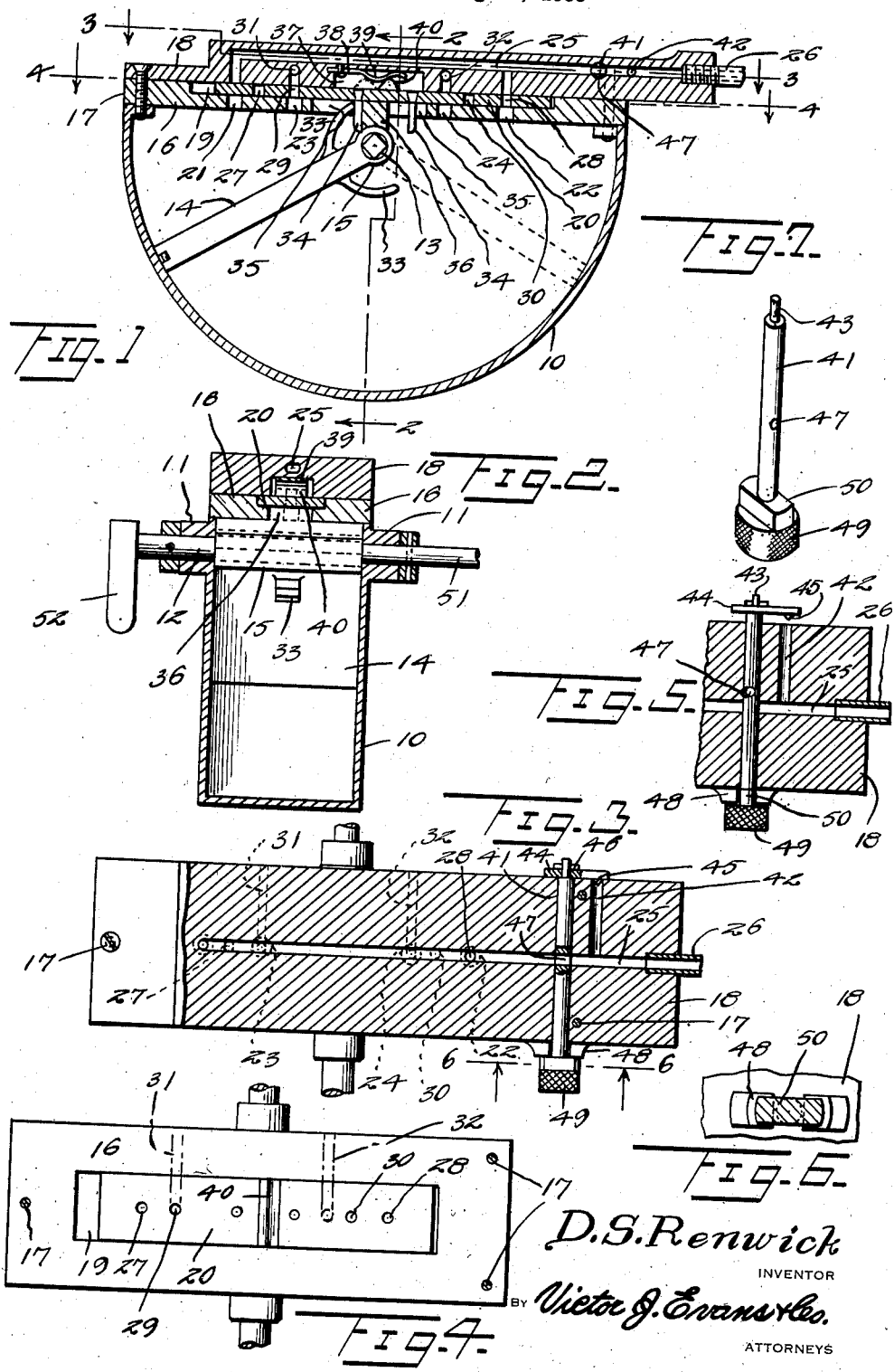
D.S. Renwick
INVENTOR
BY Victor J. Evans & Co.
ATTORNEYS Patented Sept. 30, 1941

2,257,534

UNITED STATES PATENT OFFICE 2,257,534

WINDSHIELD WIPER MOTOR

Douglas S. Renwick, Utica, Mich.

Application August 7, 1939, Serial No. 288,847

1 Claim. (Cl. 121—97)

The present invention relates to a new and improved fluid motor especially adapted for operating a windshield wiper and utilizing air suction or air pressure for operating the motor.

The primary object of the invention resides in the provision of a windshield wiper motor that is simple in construction, having relatively few parts to become worn or damaged and one which can be manufactured and sold at a reasonable cost.

The invention will be fully and comprehensively understood from a consideration of the following detailed description when read in connection with the accompanying drawing which forms a part of the application.

In the drawing:

Figure 1 is a longitudinal sectional view through the new and improved motor.

Figure 2 is a vertical sectional view taken substantially on line 2—2 of Figure 1.

Figure 3 is a transverse sectional view taken substantially on line 3—3 of Figure 1.

Figure 4 is a transverse sectional view taken substantially on line 4—4 of Figure 1.

Figure 5 is a detail sectional view of parts shown in Figure 3.

Figure 6 is a detail sectional view taken substantially on line 6—6 of Figure 3, and Figure 7 is a perspective view of the control rod removed from the motor.

Referring to the drawing for a more detailed description thereof, it will be noted that the improved windshield wiper motor comprises a substantially semi-cylindrical-shaped casing 10, the side walls of which are formed with bearings 11 for receiving the rotary shaft 12. The portion of the shaft 12 which is disposed within the casing 10 is substantially square-shaped in cross section as indicated at 13 in Figure 1 and receives thereon the piston blade 14 adapted to reciprocate within the casing 10 and to have wiping contact with the walls thereof. The end of the blade 14 which is secured to the shaft has a bearing surface 15 which is formed with a square-shaped bore for conforming with the square-shaped section 13 of the shaft 12. Thus the blade 14 and shaft 12 operate in unison as pressure or suction is applied to said blade.

The upper end of the casing 10 has connected thereto a plate 16 to which is attached, by means of rivets or the like 17, a second plate 18. The plate 16 is recessed as indicated at 19 and supports therein a slidable plate 20, said plate adapted to be actuated by the blade 14 for admitting air into the casing 10 for operating said blade and the windshield wiper. Suction ports 21 and 22 are formed in the plate 16 and atmospheric airports 23 and 24 are likewise formed in said plate. A passageway 25 is formed longitudinally of the plate 18 and has connection with the intake manifold of an internal combustion engine by means of the hose connection 26. Thus suction from the engine through the passageway 25 on one side of the blade 14 in conjunction with atmospheric air admitted on the other side of said blade will reciprocate the same within the cylinder 10 as the respective ports are closed and opened by means of the sliding plate 20. It will be noted that the plate 20 is formed with openings 27 and 28 adapted to align with the suction openings 21 and 22, respectively, and is likewise formed with openings 29 and 30 adapted to align with the atmospheric air ports 23 and 24, through openings 31 and 32, respectively, formed in the top plate 18. In the position of the blade 14 as shown in Figure 1 of the drawing, the suction port 21 and atmospheric air port 24 have been closed and the air port 23 and suction port 22 opened, by means of the sliding plate 20. The suction of air on one side of the blade through the port 22 together with atmospheric pressure being admitted through the port 23 will swing the blade to the dotted line position at which time the plate will be moved by a means to be hereinafter described to open the ports 21 and 24 while simultaneously closing the ports 22 and 23, respectively, the operation continuing until pressure or suction has been relieved from the passageway 25.

The means for sliding the plate 20 upon reciprocating the blade 14 comprises the use of arcuate-shaped arms 33 extending from the blade 14 and positioned adjacent the pivotal end thereof, said arms adapted to contact fingers 34 which extend downwardly from the plate 20 through openings 35 formed in the plate 16. A member 36 is formed integral with the plate 16 and extends transversely of the casing 10 serving as a seal in cooperation with the blade 14. It will be noted that the pivotal end of the blade 14 is in engagement with the member 36, said member being concaved to accommodate the rounded surface of the bearing 15. The member 36 also serves as a stop for the plate 20 against which the fingers 34 contact when actuated by the blade 14. It will be readily apparent that as the blade 14 is caused to move within the casing 10, and for example, from the full line position to the dotted line position, one of the arms 33 will contact one of the fingers 34 to move the plate 20 within the recess 19 thereby opening the ports 21 and 24 while closing the ports 22 and 23. The swing of the blade to the left will reverse these events.

The plate 18 is recessed as indicated at 37 and has secured therein a spring-like member 38 having a portion concaved as indicated at 39 which cooperates with the upwardly projecting lug 40 formed centrally of the plate 20 for urging said plate in its movement within the recess 19. The momentum of the blade 14 working against either of the fingers 34 moves the sliding plate 20 causing the lug 40 to engage the concaved portion 39 bending the spring upward, and when passing over the concaved portion, the expansion of the spring to its normal position will force the sliding plate 20 to the limit of its travel within the recess 19 thereby producing a snap action for covering and uncovering the ports in the plate 16.

In Figures 3, 5 and 7 there is more particularly disclosed the means for starting and stopping the motor, the same comprising a control rod 41 extending through one end of the plate 18 and intersecting the passageway 25. A by-pass 42 adapted to be controlled by the rod 41 is formed in the plate 18 and has communication with the passageway 25, said by-pass adapted to be opened only when the wiper motor is in inoperative position. The end 43 of the rod 41 is reduced in diameter forming a shoulder for receiving the plate 44, said plate being a relatively thin spring member that is formed with a projection 45 fitting within the by-pass 42 for closing the same. As is to be understood, the rod 41 extends within the plate 44 and a pin 46 is locked to the shaft for retaining the plate in position. The rod 41 is formed with a central opening 47 adapted upon rotation to align with the passageway 25 as shown in Figure 3 of the drawing. By rotating the rod 41, the operator may control the speed of the motor by controlling the size of the opening through which the air passes. The opposite end of the rod 41 extends through a shoulder 48 formed on the face of the plate 18 and the rod is formed with a control knob 49. The portion of the rod projecting beyond the shoulder 48 is formed with a substantially rectangular-shaped portion as indicated at 50 in Figure 6 of the drawing which serves as a means for guiding the alignment of the opening 47 with the passageway 25 at which time the position of the portion 50 with respect to the shoulder 48 is that shown in Figures 3 and 6 of the drawing. Upon rotating the rod 41 approximately 90° to close the passageway 25, the rod 41 will align with the opening formed in the shoulder 48, whereby said rod may be urged inwardly to the position shown in Figure 5 of the drawing to uncover the by-pass 42. The by-pass is provided to prevent unbalancing the carburetor mixture so that the same amount of air will be drawn in whether or not the wiper is operating.

It is to be understood that a windshield wiper arm is to be attached to the reduced end 51 of the shaft 12 and that the casing 10 may be secured by any desired means to the vehicle. The arm 52 is secured to the end of the shaft 12 as a means for manually rotating said shaft when the occasion requires.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described, and, therefore, such changes and modifications may be made therein as do not affect the spirit of the invention nor exceed the scope thereof as expressed in the appended claim.

What is claimed is:

A windshield wiper motor comprising, a semi-cylindrical-shaped casing having a shaft extending therethrough, a blade carried by said shaft and having wiping contact with the walls of said casing, a cover for said casing including upper and lower uniting plates, said upper plate having a longitudinal fluid passageway formed therein and a pair of passages at right angles thereto, said lower plate having a port formed therein on each side of said shaft communicating with said passageway through said right angle passages and the interior of said casing, exhaust ports in said upper plate on each side of said shaft communicating with said casing, a valve member slidably disposed in a recess formed in said lower plate adapted to be actuated by said blade for simultaneously controlling the admission and exhaust of fluid through said passageway, passages, and ports, and auxiliary means carried by said upper plate for facilitating movement of said valve member.

DOUGLAS S. RENWICK.